July 15, 1930.  G. H. TABER  1,770,558
BRAKING SYSTEM FOR MOTOR VEHICLES
Filed Jan. 17, 1929  3 Sheets-Sheet 1
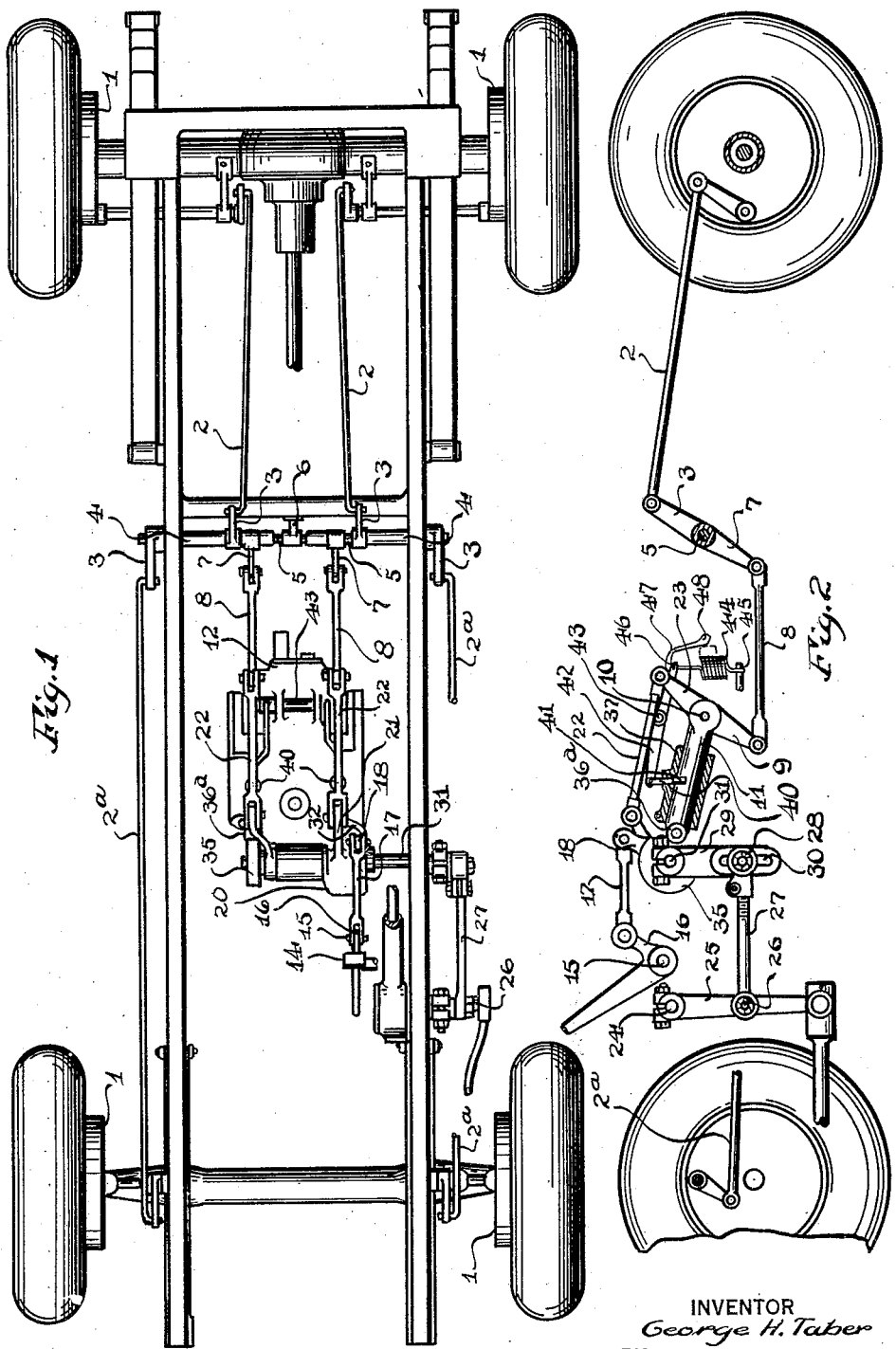
INVENTOR
George H. Taber
BY
his ATTORNEY

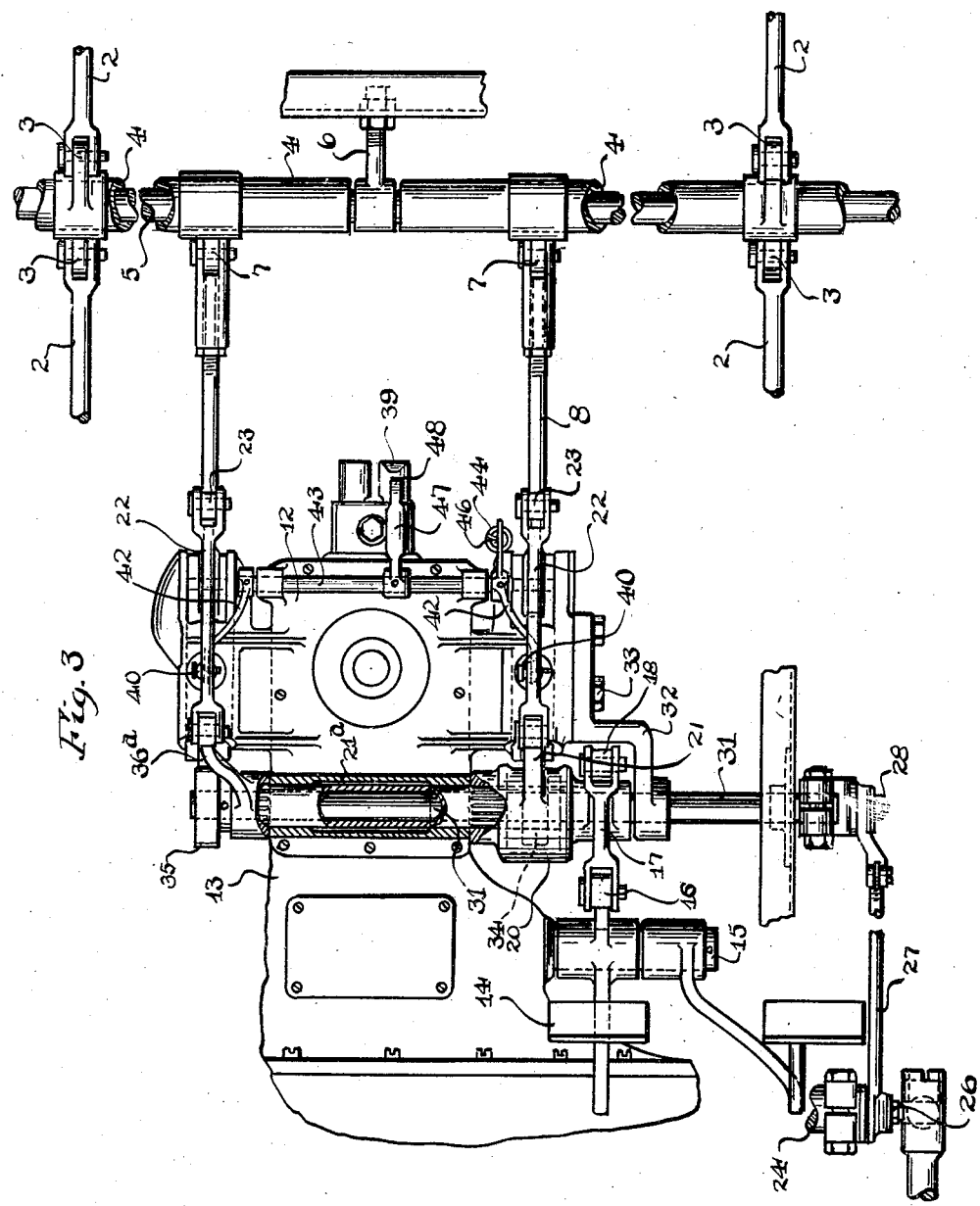

July 15, 1930.　　　　G. H. TABER　　　　1,770,558
BRAKING SYSTEM FOR MOTOR VEHICLES
Filed Jan. 17, 1929　　　3 Sheets-Sheet 3
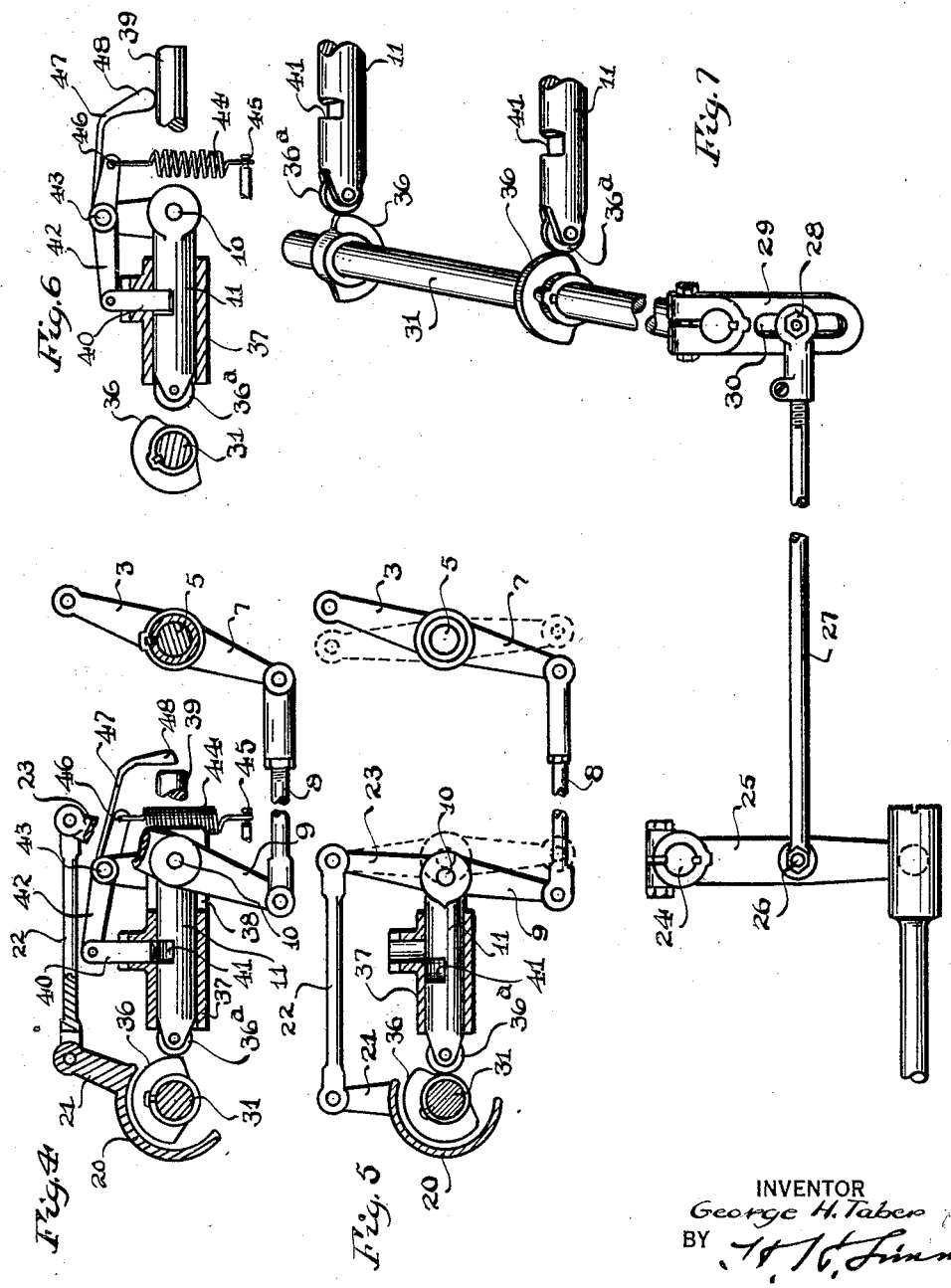
INVENTOR
George H. Taber
BY
his ATTORNEY Patented July 15, 1930

1,770,558

UNITED STATES PATENT OFFICE

GEORGE H. TABER, OF ELMIRA HEIGHTS, NEW YORK

BRAKING SYSTEM FOR MOTOR VEHICLES

Application filed January 17, 1929. Serial No. 333,068.

The present invention relates to braking mechanisms for motor vehicles and an object of the invention is to provide a braking mechanism which will permit the proper steering of the vehicle during the braking action. Another object of the invention is to provide a braking mechanism which will provide a construction in which the braking action will assist in the steering of the vehicle in making turns. Still another object of the invention is to provide a braking mechanism which may be operated to permit the wheels on one side of the vehicle to turn about their axes while the braking mechanism acts on those wheels on the other side or inner side of the turn to produce a drag to assist in turning to that side. Another and further object of the invention is to provide a construction which gives a braking action while retaining control of the vehicle through the steering mechanism. Another and still further object of the invention is to provide a construction for obtaining automatically greater braking action on that side of the vehicle toward which the vehicle is turning. A further object of the invention is to provide a braking mechanism in which the braking action on one side of the vehicle is released upon the turning of the vehicle toward the other side. A still further object of the invention is to render the automatic control ineffective when the vehicle is being driven on other than high gear.

To these and other ends, the invention consists of certain parts and combinations of parts, all of which will be hereinafter described; the novel features being pointed out in the appended claims.

In the drawings:

Fig. 1 is a fragmentary plan view showing the chassis of a motor vehicle equipped with one embodiment of the present invention;

Fig. 2 is a fragmentary view partially in section of the same embodiment;

Fig. 3 is an enlarged fragmentary plan view with parts in section;

Fig. 4 is a fragmentary sectional view showing the straight ahead position of the mechanism controlled by the steering means, the vehicle being in high gear;

Fig. 5 is a similar view of the vehicle in high gear showing that part of the mechanism controlling the inside brakes;

Fig. 6 is a view similar to Figs. 4 and 5 showing the mechanism controlled by the steering means locked out of operation when in other than high gear; and Fig. 7 is a fragmentary view showing the connection between the steering means and means which is controlled thereby to control the brake mechanism.

With the ordinary braking mechanism in which braking action is applied to opposite sides of the vehicle either on the two rear wheels or the entire four wheels, with the application of the braking mechanism on the turning of corners or making turns, the braking action is applied to both sides of the vehicle. This has a tendency on fast driving or on skiddy surfaces to create a skidding action and loss of control of the vehicle, the cause of many accidents.

Prior to this invention it has been suggested to operate the braking mechanism so that the braking action takes place only on one rear wheel on that side of the vehicle in which the latter is to turn so that the wheel on the other side is free to rotate and guide the vehicle in the proper direction thus permitting the control of the vehicle through the steering mechanism. The prior suggestions along this line have, however, been limited to the braking of only the rear wheels and the control of the braking mechanism by the operator of the machine, thus imposing upon the operator not only the additional work in driving the car but also additional mental operations at a time when considerable judgment is required.

According to this invention, the braking mechanism acts on the front and the rear wheels and is controlled automatically upon the movement of the steering member by the operator, so as to apply the braking action only to that side of the vehicle in which the turn is to be made whereas, the braking mechanism acts on both sides of the vehicle upon its operation when the vehicle is travelling straight ahead. The amount of the release of the braking action on either side of the vehicle is dependent upon the amount or the radius of the turn. The braking action is applied automatically as the wheel is straightened so that the vehicle is under control of the braking mechanism on both sides after the turn is made. Provision may also be made for rendering the automatic feature inoperative when the vehicle is travelling on other than high speeds for the purpose of permitting the use of the motor as a brake in travelling declining and winding roads.

In the illustrated embodiment of the invention the braking mechanisms embodies four brakes 1 of any suitable construction connected to the front and the rear wheels of the vehicle. From the brakes on the front wheels extend brake rods 2ª, and from the brakes on the rear wheels extend rods 2, all of which connect by arms 3 projecting in opposite directions in pairs from one of two rock shafts 4. These rock shafts 4 are mounted in alignment and, in this instance, are supported end to end upon a bearing shaft 5. A bracket 6 may be secured to a frame cross member for support and surrounds the bearing shaft 5 between the adjacent ends of the two rock shafts 4. Each rock shaft 4 also has an arm 7 extending therefrom to which an adjustable connecting rod 8 is pivotally connected. The other end of each connecting rod 8 is pivotally connected to one arm 9 of a double arm lever which is pivoted or fulcrumed at 10 to a supporting member 11, there being, in this instance, two of the double arm levers 9, each mounted upon its own support and both supports being mounted on a cover plate 12 of a transmission mechanism 13.

The two parts of the braking mechanism have a single controlling member under the control of the operator of the machine. This controlling member, in this instance, embodies a foot pedal 14 or lever pivoted at 15 on the shaft of the controlling lever of the clutch shaft and having an arm 16 which is pivotally connected to a link 17. The link 17 in turn is pivotally connected to an arm 18 on a rocking member 20 which is journalled in a sleeve 21ª also supported on the cover 12 of the transmission mechanism. This rocking member 20 has two arms 21 projected therefrom and each pivotally connected to one of two links 22 which in turn is pivotally connected to the arm 23 of one of the double arm levers heretofore mentioned. It is apparent that the depression of the pedal 14 turns the rock shaft 20 and operates the braking mechanism to apply all four brakes.

The automatic control of the braking mechanism so as to effect the braking action only on that side of the vehicle on which a turn is to be made is effected, in this instance, through the steering mechanism. The steering mechanism is not completely shown but it may consist of the commonly employed steering mechanism which has a worm wheel shaft 24 with a swinging arm 25 clamped thereto, the swinging arm being connected to the drag link of the steering gear. To this swinging arm 25 may be pivoted at 26 an extensible rod 27 which may be pivotally and adjustably connected at 28 to an arm 29, the arm having a slot 30 to permit the adjustment. The arm 29 is rigidly secured to a shaft 31 which is arranged within the rocking member 20 to turn about an axis coincident with the axis of turning of the rocking member. That portion of the shaft 31 projected beyond the rocking member is supported by an arm 32 bolted at 33 to the top or cover 12 of the transmission mechanism. On the shaft 31 are mounted two cams 34 and 35 having their high concentric points 36 projecting in opposite directions or from opposite sides of the shaft 31. These cams 34 and 35 cooperate each with an anti-friction roller 36 on one of the supports 11. The supports 11 are movably mounted and are, in this instance, in the form of plungers mounted in sleeves or bored guides 37 formed on the cover 12 of the transmission mechanism, these guides having slots 38 in opposite walls to receive arms 9 and 23 of the two armed levers hereinbefore mentioned in order to permit the shifting of the pivots or fulcrums of said two armed levers. When the vehicle is travelling straight ahead on high gear the rollers 36ª cooperate with the high points 36 of the cams 34 and 35 so that the operation of the controlling member 14 of the brake mechanism brings into action the brakes on both sides of the vehicle. However, with the turning of the vehicle through the steering mechanism, the shaft 31 is turned and causes one of the cams 34 or 35 to move with its concentric portion 36 in engagement with the roller 36ª whereby no action or movement of the support 11 carrying such roller 36ª takes place, with the result that the brakes controlled by such support 11 remain applied. The other cam 34 or 35 shifts in the direction to permit the roller 36ª cooperating with the high point 36 of such cam to shift to the low point of the cam and through the action of the release springs of the brakes on the side of the vehicle more remote from the direction of turn to release the wheels controlled by such brakes whereby the braking action is applied only on that side of the vehicle on which the turn is to be made.

On winding and declining roads, it is desirable to employ the motor as a brake through the shifting into a lower transmission gear and under this condition the braking action on all four wheels should not be interfered with on curves. With this end in view, a means is provided for rendering the automatic control inoperative when the vehicle is shifted out of high gear. This result is accomplished, in this instance, by locking the automatic brake control against operation through the transmission mechanism.

As it is well known the transmission mechanism now most generally employed utilizes a gear shipper rod 39 and this controls, in this instance, the locking mechanism for the automatic brake control. This locking mechanism embodies, in this instance, two locking plungers 40 each mounted on one of the guides 37 and movable into and out of a locking notch 41 formed in each of the movable supports 11. This locking plunger is pivotally supported by an arm 42 on a rock shaft 43 which turns on the lid or cover 12 and supports both arms 42. Normally both of these locking plungers 40 are held out of locking relation with the movable supports 11 by a spring 44 secured at one end at 45 to the cover and at the other end to an arm 46 on the rock shaft 43. Control of the rock shaft 43 is effected through the gear shipper 39 and this is secured by providing the rock shaft 43 with an arm 47 which has a yielding portion 48 and which rests at its free end upon the shipper shaft or rod 39. When this shipper is in high gear position, the spring 41 acts to throw the arm 47 to its lowest position but when the shipper is in its second or other gear position it moves the arm 47 upwardly and throws the two locking plungers downwardly bringing them into interlocking position with the supports 7 and preventing the shifting of the fulcrums of the two armed levers 9—23 toward the low parts of the cam, thus rendering the automatic control ineffective during the period that the transmission is out of high gear. While in this instance, the locking mechanism is shown as being rendered effective on high gear, it is apparent that this action may take place on other desirable gears.

The operation of the invention will be understood from the foregoing description but it may be summarized as follows: When driving straight ahead and it is desired to apply the brakes, the depression of the pedal 14 effects the application of the brakes on both sides of the vehicle. When turning to the right or left and the brake pedal 14 is depressed, the steering mechanism will control the braking mechanism in such a manner that the brakes on the side opposite to the side toward which the turn is made will, if the pedal is applied before the steering wheel is turned, be released on the turning of the steering wheel and the amount of this release will be dependent upon the amount the steering wheel is turned due to the shape of the cam. However, if the vehicle is turned before the application of the brakes, then upon the depression of the pedal the brakes on the side of the vehicle opposite to the side toward which it is turned, will go into action if at all an amount dependent on the amount the vehicle is turned. As the wheels are straightened on the completion of the turn, the braking mechanism which has been released is automatically brought into action or reapplied through the cams of the steering mechanism. Normally the locking mechanism is in locking relation with both of the supports 11 but upon the throwing of the vehicle into high gear, the locking mechanism is thrown out of locking relation with the supports 11 so that the automatic control of the braking mechanism may take place while the car is being steered from a straight course.

From the foregoing it will be seen that it is possible to apply the front and rear brakes to either side of the vehicle, while releasing the braking action of the front and rear brake on the other side of the vehicle for effective steering. This result is accomplished automatically when the vehicle is steered in either direction from a straight ahead drive. When driving straight ahead the brakes on both sides of the vehicle are effective. This braking action assists in steering by the drag produced on the turning side of the vehicle. It becomes effective without any mental action upon the part of the user other than the use of the brake pedal and the turning of the steering wheel both of which are subconscious actions. This invention is particularly advantageous to rapid drivers and the novice who has the tendency to drive rapidly, this is especially true on slippery roadways. Skidding is reduced to a minimum without interfering with the steering action. It gives to the inexperienced driver automatically the results which an accomplished driver obtains through long practice. The automatic control is rendered ineffective when the car is travelling on other than high gear down a decline with winding curves.

What I claim as my invention and desire to secure by Letters Patent is:

1. In a braking system for wheeled motor vehicles a braking mechanism, and two controlling mechanisms, one under the control of the operator and controlling braking action on both sides of the vehicle and the other automatic and effecting the braking action only on that side of the vehicle nearest a turn.

2. A braking system for motor vehicles comprising a braking mechanism having means for effecting a braking action on both sides of the vehicle, means under the control of the operator for controlling the braking mechanism to effect braking action on both sides of the vehicle, and automatic means for controlling said braking mechanism to effect a braking action on either side of the vehicle independently of the other.

3. A braking system for motor vehicles comprising a braking mechanism having means for effecting a braking action on both sides of the vehicle, means under the control of the operator for operating the braking mechanism for effecting a braking action on both sides of the vehicle, a steering mechanism, means controlled by the steering mechanism reducing the braking action of the braking mechanism on either side of the vehicle depending on the direction in which the steering mechanism is turned, a transmission mechanism, and means controlled by the transmission mechanism for rendering ineffective on the braking mechanism the means controlled by the steering mechanism.

4. A braking system for motor vehicles comprising a braking mechanism having means for effecting braking action on both sides of the vehicle and including two levers one for each side of the vehicle, a shiftable support for each of said levers, means under the control of the operator for simultaneously shifting both of the levers on their pivots to effect braking action on both sides of the machine, and mechanism for effecting the shifting of the supports of each of said levers to effect the release of the braking action on either side of the machine.

5. A braking system for motor vehicles comprising a braking mechanism having means for effecting braking action on both sides of the vehicle and including two levers, one for each side of the vehicle, a shiftable support for each of said levers, means under the control of the operator for shifting both of the levers on their pivots to effect braking action on both sides of the machine, and two cams for effecting the shifting of the supports of each of said levers to effect the release of the braking action on either side of the machine.

6. A braking system for motor vehicles comprising a braking mechanism having means for effecting braking action on both sides of the vehicle and including two levers, one for each side of the vehicle, a shiftable support for each of said levers, means under the control of the operator for shifting both of the levers on their pivots to effect braking action on both sides of the machine, two cams for effecting the shifting of the supports of each of said levers to effect the release of the braking action on either side of the machine, and a steering mechanism having connection with said cams to effect the release of the braking action on either side of the vehicle, depending on the direction in which the steering mechanism is turned.

7. A braking system for motor vehicles comprising a braking mechanism having means for effecting braking action on both sides of the vehicle, means under the control of the operator to operate the braking mechanism to effect braking action on both sides of the vehicle, a steering mechanism, means controlled by the steering mechanism for reducing the braking action on either side of the vehicle depending on the direction in which the steering mechanism is turned, and locking mechanism for locking the last named means against action.

8. A braking system for motor vehicles comprising a braking mechanism having means for effecting braking action on both sides of the vehicle, means under the control of the operator to operate the braking mechanism to effect braking action on both sides of the vehicle, a steering mechanism, means controlled by the steering mechanism for reducing the braking action on either side of the vehicle depending on the direction in which the steering mechanism is turned, locking mechanism for locking the last named means against action, a transmission mechanism, and connection between said transmission mechanism and said locking mechanism for holding said locking mechanism out of locking position when the transmission mechanism is adjusted to a certain position.

9. A braking system for motor vehicles comprising a braking mechanism having two means for reducing the braking action, one on one side of the vehicle and the other on the other side of the vehicle, each of said means including a swinging member having a shiftable pivot, a member under control of the operator connected to both of said members for swinging them around their pivots in order to effect the braking action on both sides of the vehicle, and means for effecting the shifting of either of said members in order to release the braking action on one side of the vehicle.

10. In a braking system for motor vehicles, the combination of a braking mechanism having means for braking two sides of a vehicle, and means for controlling said braking mechanism to produce a braking action on either side of the vehicle independently of the other, and a transmission mechanism controlling said last named means to bring it into and out of action.

GEORGE H. TABER.